US00RE34708E

United States Patent [19]

Hansma et al.

[11] E Patent Number: Re. 34,708

[45] Reissued Date of Patent: Aug. 30, 1994

[54] SCANNING ION CONDUCTANCE MICROSCOPE

[75] Inventors: Paul K. Hansma; Barney Drake, both of Santa Barbara, Calif.

[73] Assignee: The Regents of the University of California, Berkeley, Calif.

[21] Appl. No.: 875,441

[22] Filed: Apr. 29, 1992

Related U.S. Patent Documents

Reissue of:

[64] Patent No.: 4,924,091
Issued: May 8, 1990
Appl. No.: 305,465
Filed: Feb. 1, 1989

[51] Int. Cl.[5] ..... G21K 5/08
[52] U.S. Cl. ..... 250/306; 250/423 F
[58] Field of Search ..... 250/306, 307, 423 F

[56] References Cited

U.S. PATENT DOCUMENTS 4,868,396 9/1989 Lindsay ..... 250/306
4,969,978 11/1990 Tomita et al. ..... 250/306
5,202,004 4/1993 Kwak et al. ..... 250/306

OTHER PUBLICATIONS

"Scanning Tunneling Microscope for Electrochemistry-a New Concept for the In Situ Scanning Tunneling Micro. in Electrolyte Solutions", Itaya et al., *Surface Sci. Letters,* Jul. 88, 201 pp. L507-L512.

"Tunneling Microscopy in an Electrochemical Cell: Images of Ag Plating" Sonnenfeld, et al., *App. Phy. Lett.* vol. 49, No. 18, Nov. 3, 1986, pp. 1172-1174.

"The Scanning Ion-Conductance Microscope", Hansma et al., *Science,* vol. 243, pp. 641-643, Feb. 3, 1989.

*Primary Examiner*—Bruce C. Anderson
*Attorney, Agent, or Firm*—Oblon, Spivak, McClelland, Maier & Neustadt

[57] ABSTRACT

A scanning ion conductance microscope, SICM, which can image the topography of soft non-conducting surfaces covered with electrolytes by maintaining a micropipette probe at a constant conductance distance from the surface. It can also sample and image the local ion currents above the surfaces by scanning the micropipette probe in a plane located at a constant distance above the surface. Multiple micropipettes mounted in a multi-barrel head and containing various ion specific electrodes allow simultaneous scanning for different ion currents.

18 Claims, 3 Drawing Sheets

SCANNING ION CONDUCTANCE MICROSCOPE

Matter enclosed in heavy brackets [ ] appears in the original patent but forms no part of this reissue specification; matter printed in italics indicates the additions made by reissue.

This invention was made with Government support under Contract No. N00014-86-K-2058 awarded by the Office of Naval Research. The Government has certain rights in this invention.

BACKGROUND OF THE INVENTION

This invention relates to scanning microscopes used for imaging the topography of surfaces and, more particularly, to a scanning ion conductance microscope comprising, a reservoir holding a sample to be scanned therein; a micropipette having a tip communicating with a shaft; an electrolyte solution disposed within the reservoir covering the sample and disposed within the tip and shaft of the micropipette; a first microelectrode disposed in the shaft in electrical contact with the electrolyte therein; a second microelectrode disposed in the reservoir in electrical contact with the electrolyte therein; scanning means for scanning the tip of the micropipette over a top surface of the sample in a scanning pattern; voltage means for applying a voltage across the first and second microelectrodes; current means for measuring the current flowing between the first and second microelectrodes and for supplying an indication of the current at an output thereof; and, control logic means having an output connected to the scanning means and an input connected to the output of the current means for causing the scanning means to set the height of the tip at a desired distance above the top surface and for outputting data of interest related to the top surface as it is scanned.

The family of scanning probe microscopes that have been introduced to the scientific community of recent years is broadening the frontiers of microscopy. As typified by the greatly simplified general example of FIG. 1, these microscopes scan a sharp probe 10 over the surface 12 of a sample 14 to obtain surface contours, in some cases actually down to the atomic sale. The probe 10 may be affixed to a scanning mechanism and moved in a scan pattern over the surface 12 or alternately (and equally effectively because of the small sizes involved) the probe 10 may be stationary with the sample 14 mounted on a scanning mechanism that moves the surface 12 across the probe 10 in a scanning pattern. The point 16 of the probe 10 rides over the surface 12 as the probe is moved across it as indicated by the arrow 18. As the point 16 follows the topography of the surface 12, the probe 10 moves up and down as indicated by the bi-directional arrow 20. This up and down movement of the probe 10 is sensed to develop a signal which is indicative of the z directional component of the 3-dimensional surface 12.

The use of a piezoelectrically driven tube to affect the x-, y-, and z-directional movements employed in the scanning process is generally accepted in such devices and such well known equipment is preferred for use in the scanning aspects of this invention as well. Various methods are employed to sense the vertical movement of the probe 10. Where the sample 14 is of an electrically conductive material and the scanning is conducted in a non-conductive environment such as air, current flow between the probe point 16 and the surface 12 can be employed to control the vertical position of the probe 10. The vertical control signal then supplies the z-directional component. For non-conducting materials it is more common to measure the vertical deflection of the probe 10 directly in order to develop the z-directional component.

While the contact type of scanning probe microscope as described above works well in certain environments, in other environments it is virtually worthless. This is particularly true where the sample is of a soft material which cannot be subjected to the contacting probe described above. While the biasing force of the probe against the surface of the sample in such prior art apparatus is exceedingly small, it is still there and the probe itself is quite sharp in order to follow the contours demanded of it. Accordingly for example, if a soft membrane is contact scanned, it is torn by the probe.

Additionally, despite their various attributes, such prior art scanning microscopes can only supply a visualization of the surface topography. They cannot show, for example, ion flow capabilities of and through the surface under examination.

Wherefore, it is an object of the present invention to provide a non-contacting scanning microscope which can be used to display an indication of the surface topography of materials which cannot be scanned with a contacting probe.

It is another object of the present invention to provide a scanning microscope which can be used to display an indication of ion flow capabilities of and through a surface under examination.

Other objects and benefits of this invention will become apparent from the description which follows hereinafter when taken in conjunction with the drawing figures which accompany it.

SUMMARY

The foregoing objects have been achieved in the scanning ion conductance microscope capable of providing both topographic and ion conductance information about a sample of the present invention comprising, a reservoir holding a sample to be scanned therein; a micropipette having a tip communicating with a shaft; an electrolyte solution disposed within the reservoir covering the sample and disposed within the tip and shaft of the micropipette; a first microelectrode disposed in the shaft in electrical contact with the electrolyte therein; a second microelectrode disposed in the reservoir in electrical contact with the electrolyte therein; scanning means for scanning the tip of the micropipette over a top surface of the sample in a scanning pattern; voltage means for applying a voltage across the first and second microelectrodes; current means for measuring the current flowing between the first and second microelectrodes and for supplying an indication of the current at an output thereof; control logic means having an output connected to the scanning means and an input connected to the output of the current means for causing the scanning means to set the height of the tip at a desired distance above the top surface and for outputting data of interest related to the top surface as it is scanned; feedback means connected between the scanning means and the control logic means for providing the control logic means with an indication of a z-directional component of the position of the tip of the micropipette; and wherein, the control logic means includes first logic for causing the scanning means to position the tip of the micropipette at a distance above the top surface which will maintain the ion conductance between the first and second electrodes at a constant value which will cause the tip to follow the top surface in close non-contacting proximity thereto whereby the data of interest output by the control logic means reflects the topology of the top surface; and, the control logic means includes second logic for causing the scanning means to scan the tip of the micropipette in a plane parallel and close adjacent above the top surface whereby the data of interest output by the control logic means reflects the ion conductance of the top surface at the positions of the tip.

In an alternate embodiment, there are a plurality of the micropipettes disposed to form a multi-barrel scanning head and a plurality of the first microelectrodes are disposed in respective ones of the micropipettes. Each of the microelectrodes is specific to a different ion whereby when the second logic of the control logic causes the scanning means to scan the tip of the micropipette in a plane parallel and close adjacent above the top surface, the data of interest output by the control logic means reflects the ion conductance of the top surface at the positions of the tip of each of the micropipettes.

DESCRIPTION OF THE DRAWINGS

FIG. 3 is a simplified drawing of the scanning ion conductance microscope of FIG. 2 showing a modification thereof wherein multiple scanning pipettes are employed and its manner of operation to obtain the imaging of ion currents through channels in membranes and the like.

DESCRIPTION OF THE PREFERRED EMBODIMENT

Figure 1:
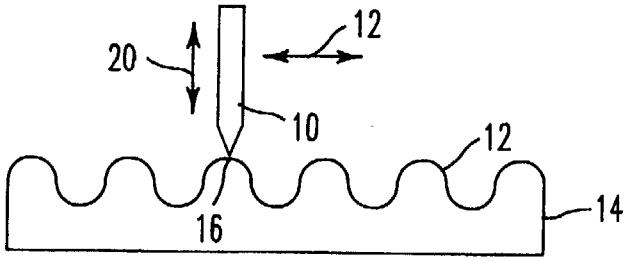
FIG. 1 PRIOR ART
FIG. 1 is a simplified drawing showing the operation of prior art scanning microscopes.
Figure 2:
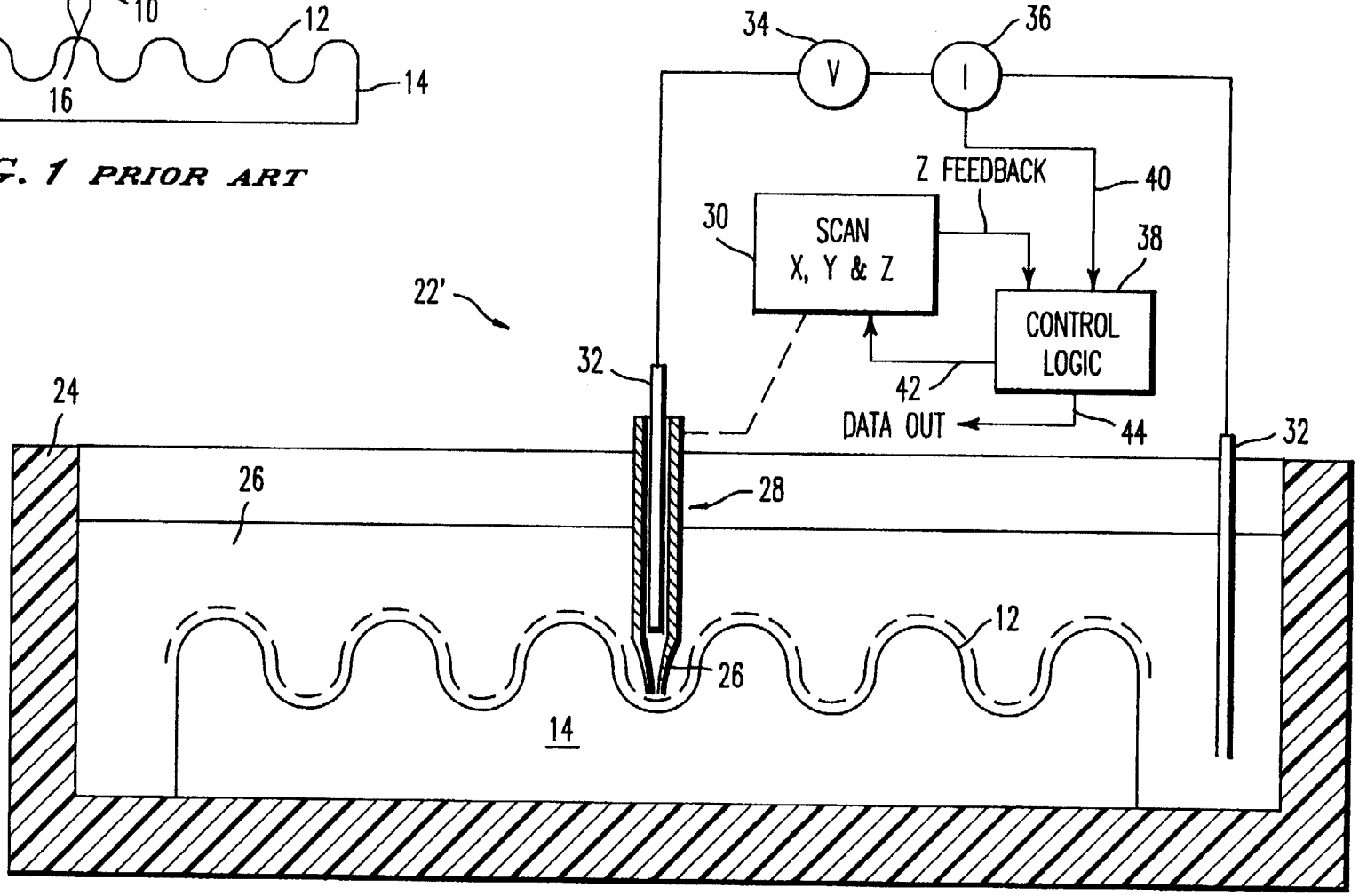
FIG. 2 is a simplified drawing of the components of a scanning ion conductance microscope according to the present invention when operated to obtain surface topography.

The Scanning Ion Conductance Microscope (SICM) of the present invention is shown in simplified form in a preferred embodiment in FIG. 2 where it is generally indicated as 22. As depicted in FIG. 2, the SICM 22 is in the process of determining surface topography of the sample 14. The sample 14 is disposed in a reservoir 24 filled with an electrolyte 26. In the SICM 22, the scanning is accomplished by a micropipette 28 which is scanned by apparatus 30 according to techniques well known in the art as mentioned above. Again as in the prior art, the micropipette 28 could be stationary and the reservoir 24 holding the sample 14 moved by the scanning apparatus 30. The micropipette 28 (which is non-conductive and preferably of glass) has one electrode 32 disposed therein while a second electrode 32 is disposed in the electrolyte 26 within the reservoir 24. To complete the ion conductance path at the micropipette 28, the micropipette 28 is also filled with the electrolyte 26. A voltage source 34 is connected to the electrodes 32 and a current measuring transducer 36 is placed in series with the voltage source 34 to measure the current flowing and provide an indicative signal thereof to the control logic 38 on line 40. The control logic 38 performs two functions. First, it controls the scanning apparatus 30 over line 42. Second, by receiving a z-positional feedback signal from the scanning apparatus 30 it outputs the data on line 44 employed to visualize the scan results according to techniques well known in the art which, per se, form no part of the invention.

In operation, the micropipette 28 is filled with electrolyte 26 and lowered through the reservoir 24 toward the surface 12 of the sample 14 while the conductance between the electrode 32 inside the micropipette 28 and the electrode 32 in the reservoir 24 is monitored. As the tip of the micropipette approaches the surface 12, the ion conductance decreases because the space through which ions can flow is decreased. The micropipette 28 is then scanned laterally over the surface 12 while the feedback system comprising the scanning apparatus 30 and the control logic 38 as described above raises and lowers it to keep the conductance constant. The path of the tip, as indicated by the dashed line in FIG. 2, follows the topography of the surface 12, therefore. As in prior art scanning microscopes, the z-directional signal developed in the process can be employed to display the surface topography in an manner desired as, for example, by displaying on a CRT (with or without color and/or other enhancements) or by plotting on a plotter, or the like.

With respect to the micropipettes as employed by the inventors in tested embodiments to date, the early micropipettes were made from 1.5 mm outer diameter, 0.75 mm inner diameter Omega Dot capillary capillary tubing. Later micropipettes were made with similar tubing on a Brown-Flaming puller. The micropipette tip diameters were estimated using a non-destructive bubble pressure method which correlates the pipette's outer diameter to the internal pressure required for the pipette to produce a fine stream of bubbles in a liquid bath. The ratio of outer diameter to inner diameter has been found to be essentially constant along the entire length of the pipette. Inner diameters were thus estimated from the OD/ID ratio of the unpulled capillary tubing. Typically recently employed micropipettes have had tips with outer diameters of order 0.1 to 0.2 $\mu$m and inner diameters of order 0.05 to 0.1 $\mu$m.

Samples were glued onto glass substrates or directly onto electrodes and then covered with a few drops of 0.1M NaCl. The micropipette tips were allowed to fill by capillary action and then their shafts were backfilled with a syringe. The 0.1M NaCl was also employed in the micropipettes to avoid concentration cell potentials and liquid junction potentials. Reversible Ag/AgCl microelectrode holders and bath electrodes provided the necessary stability for reliable current and topographic imaging. In their testing, the inventors herein applied DC voltages of 0.03 to 0.4 V and measured DC currents (typically 1 to 10 nA) to find the conductance: generally 10-8 to 10-7S. The microscope was operated with conductances 0.9 to 0.98 of the conductance when the tip was far from the surface. At smaller conductances, the inventors found that the micropipette tip was sometimes actually pressing into the sample surface.

Figure 3:
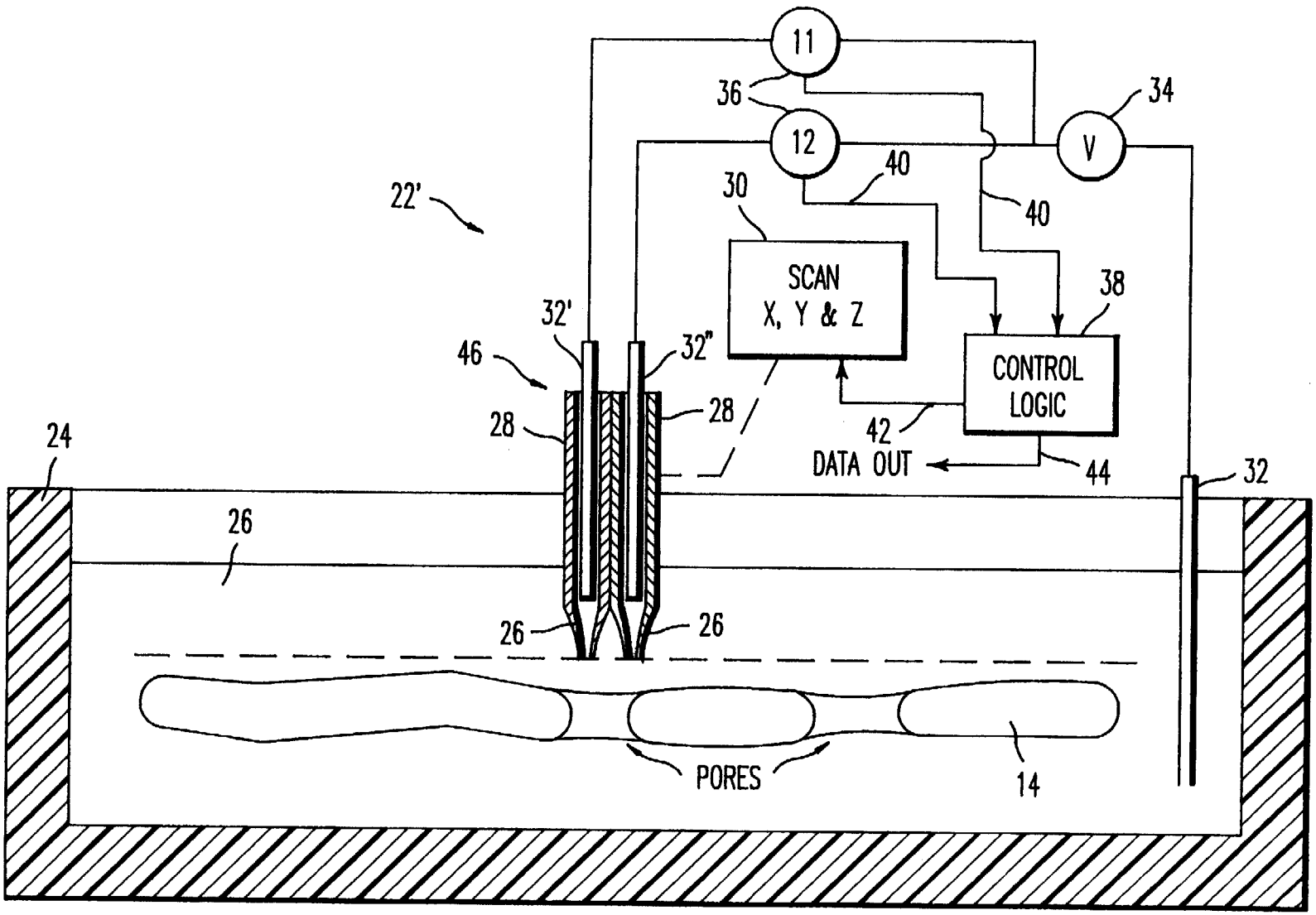

The inventors generated topographic images of their test samples by measuring the voltage that the feedback system applied to the z-axis of a single-tube x,y,z piezoelectric translator to keep the conductance constant. For ion current images, the local current was monitored as the micropipette 28 was scanned over the surface 12 at a constant height (i.e. at a constant z, being a plane parallel to the sample 14) as depicted in FIG. 3. A digital scanner supplied the x and y scan voltages for both topographic and ion current images. The z values (or ion currents) together with their x and y coordinates were recorded on a video cassette recorder via a digital data acquisition system. A program developed at the University of California Santa Barbara was used to filter the resulting image and added shading or color scales to allow surface features to be seen more easily. The inventors found that the method of statistical differences, which enhances features on their local background while suppressing noise, was especially useful for processing ion current images.

The resolution of the SICM as a function of pipette diameter was measured with a large-scale model. A glass pipette, inner diameter 0.71 mm, outer diameter 1.00 mm, was scanned at a constant height over plastic blocks with regularly spaced grooves 0.71 mm deep. The height was set by lowering the pipette until the ion conductance went from 4.2×10-5S, its value far from the surface, down to 4.0×10-5S. These conductances were measured at a frequency of 10 KHz. This resolution test showed that it should be possible, in principle at least, to resolve features as small as the micropipette's inner diameter if the noise on the ion conductance signal could be reduced below 1%. So far, in practice the inventors have resolved features down to several times the micropipette's inner diameter of 0.05 to 0.2 μm. There is a compromise between averaging the ion conductance signal from a long time to reduce noise and obtaining entire images in a reasonable time. The inventors have chosen to acquire their images in about five minutes and found that in so doing the smallest resolvable features are of order 0.2 μm.

The most promising application for the SICM is not simply imaging the topography of surfaces at submicron resolution. As mentioned above with respect to FIG. 3, the SICM 22' shown therein can image not only the topography but also the local ion currents coming out through pores in a surface. Comparison of topographic and ion current images can give a more detailed picture of the type of surface features that correlate with ion channels. This will be important in the evaluation of biological samples where not every hole is an ion channel. For images of the local ion currents, the micropipette 28 was scanned over the surface 12 at a preselected height, as indicated by the dashed line in FIG. 3, without moving up and down. It was also possible to hold the micropipette 28 over various locations on the imaged surface and measure local electrical properties. Thermal drift was small enough, approximately 0.004 μm/minute, so that it was possible to look, for example, at the time dependence of the ion currents above a pore. While the current was constant for the model system employed, it would be more subtle for biological samples.

Figure 4:
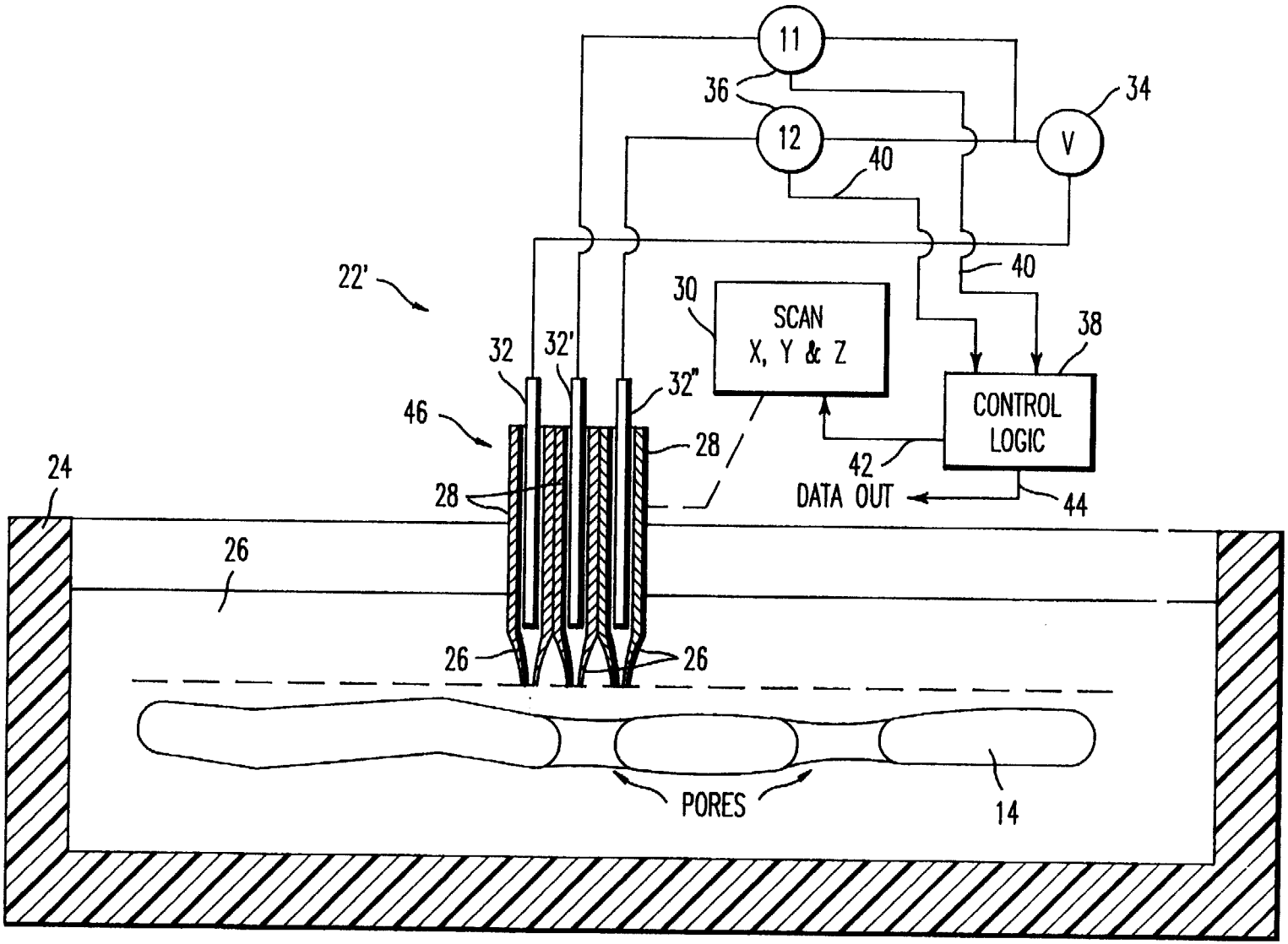
FIG. 4 is a simplified drawing of the scanning ion conductance microscope of FIGS. 2 and 3 showing a further modification thereof wherein the free electrode is replaced by an electrode contained in one of the multiple pipettes.

As should now be appreciated from the foregoing description, the SICM of this invention is the first microscope that offers both high resolution topographic and ion current images of non-conductors. Much of the necessary apparatus employed in the SICM such as the micropipettes, microelectrodes, and current amplifiers, are already used routinely by electrophysiologists. Most of the rest of it is substantially the same as used in scanning tunneling microscopy and is readily available commercially. Because the SICM operates in a saline solution or other ionic solution, the microscope is well suited for bilogical applications. As also depicted in FIG. 3, an exciting extension of the basic SICM would be to use a scanning head 46 employing multiple barrel micropipettes 28 with ion-specific electrodes 32',32''. The total current into all barrels (or the current into one barrel with a non-specific electrode provided for the purpose) could be used for feedback while the microscope could simultaneously measure and image the flow of different ions. It is anticipated by the inventors herein that such a technique will prove invaluable in the future to electrophysiologists to combine spatially resolved ion flow measurements and topological imaging of biological membranes. Another version of the SICM is depicted in FIG. 4 wherein it is labelled as 22''. As with the embodiment of FIG. 4, there is a scanning head 46 employing multiple barrel micropipettes 28 with ion-specific electrodes 32', 32'' and a non-specific electrode 32. The free electrode 32 (i.e. the electrode 32 in the reservoir 24) of the previous embodiments is replaced by the non-specific electrode 32 in one of the micropipettes 28 in the scanning head 46. All the active electrodes 32,32',32'' . . . are, therefore, included in the scanning head 46. In this way, the scanning head 46 becomes self contained and only needs electrical connections thereto. This could be of particular interest in an arrangement where the scanning head 46 was fixed and the reservoir 24 containing the sample 14 is moved to create the scanning action of the micropipettes 28 over the surface 12 of the sample 14.

Wherefore, having thus described our invention, what is claimed is:

1. A scanning ion conductance microscope comprising:

(a) a reservoir holding a sample to be scanned therein;

(b) a micropipette having an open tip communicating with a hollow shaft;

(c) an electrolyte solution disposed within said reservoir covering said sample and disposed within said tip [and shaft] of said micropipette;

(d) a first microelectrode [diposed] *disposed* in said shaft in [electrical contact] *ionic communication* with said electrolyte [therein] *solution in said open tip*, said first microelectrode being [spaced from inner sidewalls of said shaft to allow said electrolyte solution to pass between said first microelectrode and said inner sidewalls of said shaft] *in ionic communication with electrolyte solution in said reservoir via said open tip by means of electrolyte solution within said tip;*

(e) a second microelectrode disposed in said reservoir in [electrical contact] *ionic communication* with said electrolyte [therein] *solution in said reservoir and forming a continuous ionic current path between said first and second microelectrodes via the electrolyte solution in said reservoir and in said open tip;*

(f) scanning means for scanning said tip of said micropipette over a top surface of said sample in a scanning pattern;

(g) voltage means for applying a voltage across said first and second microelectrodes;

(h) current means for measuring [the] *an ionic* current flowing *in the ionic current path* between said first and second microelectrodes through said open tip of said micropipette and for supplying an indication of said current at an output thereof; and, (i) control logic means having an output connected to said scanning means and an input connected to said output of said current means for causing said scanning means to set the height of said tip at a desired distance above said top surface and for outputting data of interest related to said [top surface] *sample* as it is scanned.

2. The scanning ion conductance microscope of claim 1 and additionally comprising:

(a) feedback means connected between said scanning means and said control logic means for providing said control logic means with an indication of a z-directional component of the position of said tip of said micropipette; and wherein, (b) said control logic means includes logic for causing said scanning means to position said tip of said micropipette at a distance above said top surface which will maintain the ion conductance between said first and second [electrodes]electrodes *microelectrodes* through said open tip of said micropipette at a constant value which will cause said tip to follow said top surface in close non-contacting proximity thereto whereby said data of interest output by said control logic means reflects the [topology] *topography* of said top surface.

3. The scanning ion conductance microscope of claim 1 and additionally comprising:

said control logic means includes logic for causing said scanning means to scan said tip of said micropipette in a plane parallel and close adjacent above said top surface whereby said data of interest output by said control logic means reflects the ion conductance of said [top surface] *sample* at the positions of said tip.

4. The scanning ion conductance microscope of claim 1 and additionally comprising:

(a) a plurality of said micropipettes disposed to form a multi-barrel scanning head; and, (b) a plurality of said first microelectrodes disposed in respective ones of said micropipettes, each of said microelectrodes being specific to a different ion; and wherein, (c) said control logic means includes logic for causing said scanning means to scan said tip of said micropipette in a plane parallel and close adjacent above said top surface whereby said data of interest output by said control logic means reflects the ion conductance of said [top surface] *sample* at the positions of said tip of each of said micropipettes.

5. The scanning ion conductance microscope of claim 4 wherein:

said second [electrode] *microelectrode* is disposed within said shaft of one of said micropipettes.

6. A scanning ion conductance microscope capable of providing both topographic and ion conductance information about a sample comprising:

(a) a reservoir holding a sample to be scanned therein;

(b) a micropipette having an open tip communicating with a hollow shaft;

(c) an electrolyte solution disposed within said reservoir covering said sample and disposed within said tip [and shaft] and shaft of said micropipette;

(d) a first microelectrode disposed in said shaft in [electrical contact] *ionic communication* with said electrolyte [therein] *solution in said tip*, said first microelectrode being [spaced from inner sidewalls of said shaft to allow said electrolyte solution to pass between said first microelectrode and said inner sidewalls of said shaft] *in ionic communication with electrolyte solution in said reservoir by means of the electrolyte solution within said open tip;*

(e) a second microelectrode disposed in said reservoir in [electrical contact] *ionic communication* with said electrolyte [therein] *solution in said reservoir and forming a continuous ionic current path between said first and second microelectrodes via the electrolyte solution in said reservoir and in said open tip;*

(f) scanning means for scanning said tip of said micropipette over a top surface of said sample in a scanning pattern;

(g) voltage means for applying a voltage across said first and second microelectrodes;

(h) current means for measuring [the] *an ionic* current flowing *in the ionic current path* between said first and second microelectrodes through said open tip of said micropipette and for supplying an indication of said current at an output thereof;

(i) control logic means having an output connected to said scanning means and an input connected to said output of said current means for causing said scanning means to set the height of said tip at a desired distance above said top surface and for outputting data of interest related to said [top surface] *sample* as it is scanned;

(j) feedback means connected between said scanning means and said control logic means for providing said control logic means with an indication of a z-directional component of the position of said tip of said micropipette; and wherein, (k) said control logic means includes first logic for causing said scanning means to position said tip of said micropipette at a distance above said top surface which will maintain the ion conductance between said first and second [electrodes] *microelectrodes* through said open tip of said micropite at a constant value which will cause said tip to follow said top surface in close non-contacting proximity thereto whereby said data of interest output by said control logic means reflects the topology of said top surface; and, (l) said control logic means includes second logic for causing said scanning means to scan said tip of said micropipette in a plane parallel and close adjacent above said top surface whereby said data of interest output by said control logic means reflects the ion conductance of said [top surface] *sample* at the positions of said tip.

7. The scanning ion conductance microscope of claim 6 and additionally comprising:

(a) a plurality of said micropipettes disposed to form a multi-barrel scanning head; and, (b) a plurality of said first microelectrodes disposed in respective ones of said micropipettes, each of said microelectrodes being specific to a different ion whereby when said second logic of said control logic causes said scanning means to scan said tip of said micropipette in a plane parallel and close adjacent above said top surface said data of interest output by said control logic means reflects the ion conductance of said [top surface] *sample* at the positions of said tip of each of said micropipettes.

8. The scanning ion conductance microscope of claim 7 wherein:

said second [electrode] *microelectrode*is disposed within said shaft of one of said micropipettes.

9. [The] *A* method of [operating a scanning ion conductance microscope to provide both] *providing* topographic and ion conductance information about a sample comprising the steps of:

(a) disposing the sample to be scanned in a reservoir containing an electrolyte covering the sample;

(b) providing a micropipette having an open tip communicating with a hollow shaft;

(c) disposing an electrolyte within the tip [and shaft] of the micropipette;

(d) disposing a first microelectrode in the shaft in [electrical contact] *ionic communication* with the electrolyte [therein in non-contacting relationship with inner sidewalls of the shaft and] *in* the open tip;

(e) disposing a second microelectrode in the reservoir in [electrical contact] *ionic communication* with the electrolyte [therein] *in said reservoir and forming a continuous ionic current path between said first and second microelectrodes via the electrolyte solution in said reservoir and in said open tip;*

(f) applying a voltage across the first and second microelectrodes and measuring [the] *an ionic* current flowing *in the ionic current path* between the first and second microelectrodes through the open tip;

(g) scanning the tip of the micropipette over a top surface of the sample in a scanning pattern with the tip of the micropipette at a distance above the top surface which will maintain the ion conductance between the first and second electrodes through the open tip at a constant value which will cause the tip to follow the top surface in close noncontacting proximity thereto while providing a z-directional component of the position of the tip of the micropipette;

(h) outputting data of interest which reflects the topology of the top surface;

(i) scanning the tip of the micropipette over a top surface of the sample in a scanning pattern with the tip of the micropipette in a plane parallel and close adjacent above the top surface; and, (j) outputting data of interest which reflects the ion conductance of the [top surface] *sample* at the positions of the tip.

10. The method of claim 9 and additionally comprising the steps of:

(a) providing a plurality of the micropipettes disposed to form a multi-barrel scanning head; and, (b) disposing a plurality of the first microelectrodes in respective ones of the micropipettes with each of the microelectrodes being specific to a different ion whereby when the tip of the micropipette is scanned in a plane parallel and close adjacent above the top surface the data of interest output reflects the ion conductance of the [top surface] *sample* at the positions of the tip of each of the micropipettes.

11. The method of claim 10 wherein said step of disposing a second microelectrode in the reservoir in electrical contact with the electrolyte therein comprises the step of:

disposing the second microelectrode in the shaft of one of the plurality of micropipettes in electrical contact with the electrolyte therein.

*12. The method according to claim 9, comprising:*

*measuring a time dependence of ion conductance of the sample at a selected location of said sample.*

*13. A method of providing topographic information about a sample, comprising the steps of:*

*disposing the sample to be scanned in a reservoir containing an electrolyte covering the sample;*

*providing a micropipette having an open tip communicating with a hollow shaft and in which is disposed a first microelectrode spaced apart from the open tip within said micropipette;*

*disposing said microelectrode in said reservoir so that said electrolyte occupies said open tip and said first microelectrode in ionic communication with said electrolyte in said reservoir via said electrolyte in said open tip;*

*disposing a second microelectrode in the reservoir in ionic communication with the electrolyte in said reservoir and forming a continuous ionic current path between said first and second microelectrodes via the electrolyte solution in said reservoir and in said open tip;*

*applying a voltage across the first and second microelectrodes and measuring an ionic current following in the ionic current path between the first and second microelectrodes through the open tip;*

*scanning the tip of the micropipette over a top surface of the sample in a scanning pattern with the tip of the micropipette at a distance above the top surface which will maintain the ion conductance between the first and second microelectrodes through the open tip at a constant value which will cause the tip to follow the top surface in close non-contacting proximity thereto while providing a z-directional component of the position of the tip of the micropipette; and*

*outputting data of interest which reflects the topography of the top surface.*

*14. A method of measuring ion conductance of a sample, comprising:*

*disposing the sample in an electrolyte solution;*

*providing a first microelectrode in a micropipette having an open tip filled with said electrolyte solution;*

*providing a second microelectrode;*

*disposing the micropipette with said first microelectrode and said second microelectrode in said electrolyte solution with said first and second microelectrodes each in ionic communication with said electrolyte solution to form a continuous ionic current path through said sample and between said first and second microelectrodes via the electrolyte solution;*

*positioning the first microelectrode over at least one selected location above the top surface of the sample;*

*applying a voltage across the first and second microelectrodes;*

*measuring an ionic current flowing in the ionic current path between said first and second microelectrodes and through said sample at the selected location; and*

*outputting data which reflects the ion conductance of said sample at said selected location based on the measured ionic current.*

*15. The method according to claim 14, further comprising:*

*scanning said micropipette with said first microelectrode over the top surface of the sample in a scanning pattern with the tip in a plane parallel above the top surface,*

*measuring the ionic current flowing in said ionic current path between said first and second microelectrodes and through the sample during scanning of the tip; and*

*outputting data which reflects the ion conductance of said sample as function of said scanning pattern and the measured ionic current.*

*16. The method of claim 15, further comprising:*

*(a) providing a plurality of the first microelectrodes in respective of a plurality of micropipettes each having an open tip and disposed to form an multielectrode scanning head with each of the first microelectrodes being specific to a different ion; and,*

*(b) disposing said plurality of the micropipettes with said first microelectrodes in said electrolyte solution so that said first microelectrodes are located in close adjacent position above the top surface of the sample during scanning and the data of interest output reflects the respective ion conductances of the sample at the scanning positions of the respective first microelectrodes.*

*17. The method according to claim 14, further comprising:*

*measuring time dependance of ion conductance of said sample at said selected location.*

*18. The method of claim 14, further comprising:*

*(a) providing a plurality of the first microelectrodes disposed in respective of a plurality of said micropipettes to form a multi-electrode scanning head with each of the microelectrodes being specific to a different ion; and,*

*(b) disposing said plurality of the micropipettes with said microelectrodes in said electrolyte solution so that said microelectrodes are located in close adjacent position above the top surface of the sample at said at least one selected position and the data of interest output reflects the ion conductance of the sample at the position of the tip of each of the microelectrodes.*

* * * * *